(12) United States Patent
Khoee et al.

(10) Patent No.: US 9,771,449 B2
(45) Date of Patent: Sep. 26, 2017

(54) SYNTHESIZING NANOCAPSULES CONTAINING REACTIVE AMINE

(71) Applicants: Sepideh Khoee, Tehran (IR); SeyedHosein Payandeh GharibDoust, Tehran (IR); Parinaz Jafarzadeh, Karaj (IR)

(72) Inventors: Sepideh Khoee, Tehran (IR); SeyedHosein Payandeh GharibDoust, Tehran (IR); Parinaz Jafarzadeh, Karaj (IR)

(*) Notice: Subject to any disclaimer, the term of this patent is extended or adjusted under 35 U.S.C. 154(b) by 15 days.

(21) Appl. No.: 14/791,255

(22) Filed: Jul. 3, 2015

(65) Prior Publication Data

US 2015/0307649 A1 Oct. 29, 2015

Related U.S. Application Data

(60) Provisional application No. 62/021,016, filed on Jul. 4, 2014.

(51) Int. Cl.
*B01J 13/04* (2006.01)
*C08G 59/18* (2006.01)
*B01J 13/12* (2006.01)

(52) U.S. Cl.
CPC ............ *C08G 59/188* (2013.01); *B01J 13/04* (2013.01); *B01J 13/125* (2013.01); *C08G 59/182* (2013.01)

(58) Field of Classification Search
None
See application file for complete search history.

(56) References Cited

U.S. PATENT DOCUMENTS

| 3,270,100 A | 8/1966 | Jolkovski et al. |
| 8,318,060 B2 | 11/2012 | Sundberg et al. |

| 2006/0128835 A1 | 6/2006 | Usui |
| 2009/0261298 A1 | 10/2009 | Kondo |
| 2011/0039980 A1 | 2/2011 | Caruso et al. |
| 2012/0208895 A1 | 8/2012 | Vittirua |

OTHER PUBLICATIONS

David A. McIlroy, Microencapsulation of a Reactive Liquid-Phase Amine for Self-Healing Epoxy Composites, Macromolecules, 2010, 43, pp. 1855-1859.
Henghua Jin, Self-healing thermoset using encapsulated epoxy-amine healing chemistry, Polymer, 2012, pp. 1-7.
Hana Choi, Encapsulation of triethanolamine as organic corrosion inhibitor into nanoparticles and its active corrosion protection for steel sheets, Surface and Coatings Technology, vol. 206, Issues 8-9, Jan. 15, 2012, pp. 2354-2362.
Qi Li, Effects of processing conditions of poly(methylmethacrylate) encapsulated liquid curing agent on the properties of self-healing composites, Composites Part B: Engineering, vol. 49, Jun. 2013, pp. 6-15.
Liao Leping, Preparation and characterization of microcapsule containing epoxy resin and its self-healing performance of anticorrosion covering material, Materials Science, Feb. 2011 vol. 56 No. 4-5: pp. 439-443.
Hanna Choi, Encapsulation of aliphatic amines into nanoparticles for self-healing corrosion protection of steel sheets, Progress in Organic Coatings vol. 76, Issue 10, Oct. 2013, pp. 1316-1324.
Qi Li, Effects of dual component microcapsules of resin and curing agent on the self-healing efficiency of epoxy, Composites: Part B 55, 2013, pp. 79-85.

*Primary Examiner* — Robert C Boyle
(74) *Attorney, Agent, or Firm* — NovoTechIP International PLLC

(57) ABSTRACT

A method for nanoencapsulation of an amine adduct in a polymeric shell includes steps of emulsifying a first aqueous solution including the amine adduct into an organic solution including an organic solvent and a polymer to obtain a primary emulsion; emulsifying the primary emulsion into a second aqueous phase including a stabilizer to obtain a secondary emulsion; removing the organic solvent by evaporation to form solid nanocapsules; and separating the formed solid nanocapsules by centrifugation. The nanocapsules have an average size of between about 30 nm and about 597 nm.

20 Claims, 9 Drawing Sheets

SYNTHESIZING NANOCAPSULES CONTAINING REACTIVE AMINE

CROSS REFERRENCE TO RELATED APPLICATION

The present application claims priority from pending U.S. Provisional Patent Application Ser. No. 62/021,016, filed Jul. 4, 2014, entitled "Super-Fast and easy preparation of Nano-capsules containing reactive-amine with superb core content and high thermal resistance", the subject matter of which is incorporated by reference herein in its entirety.

SPONSORSHIP STATEMENT

This application has been sponsored by the Iranian Nanotechnology Initiative Council, which does not have any rights in this application.

TECHNICAL FIELD

The present application relates to a system for nanoencapsulation of reactive amines. More specifically, it relates to a method for encapsulation of reactive amine in a polymeric shell via multiple emulsions and use thereof in self-healing compositions.

BACKGROUND

Over the past few decades, there has been a huge interest in materials that can heal themselves because self-healing systems can increase materials lifetime, reduce replacement costs and improve the safety of the products. Self-healing materials can be classified broadly into three groups: capsule based, vascular, and intrinsic.

In the capsule based self-healing materials, upon damage-induced cracking, the microcapsules are ruptured by the propagating crack fronts resulting in release of the healing agent into the cracks by capillary action. Subsequent chemical reaction between the healing agent and the embedded catalyst heals the material and prevents further growth of the crack.

Microencapsulation has been one of the most efficient and broadly used approaches in self-healing materials development.

Microencapsulation is a process in which small droplets of liquid or particles are surrounded with a thin film. A microcapsule is a small sphere with a uniform wall around it. The material inside the microcapsule is referred to as the core, internal phase, or fill, whereas the wall is sometimes called a shell, coating, or membrane. The configuration of the core can be a spherical or irregular particle, liquid-phase suspended solid, solid matrix, dispersed solid and aggregates of solids or liquid forms.

Microcapsules can be classified to three basic categories according to their morphology, namely, mononuclear, polynuclear, and matrix types. Mononuclear (core-shell) microcapsules contain a shell around the core, while pollynuclear capsules have many cores enclosed within a shell. In the matrix encapsulation, the core material is distributed homogeneously into the shell material. In addition to the aforementioned three basic morphologies, microcapsules can also be in a form of a mononuclear within multiple shells, or form clusters of microcapsules.

There are several methods of microencapsulation, namely, solvent diffusion method, spray drying method, spray congealing method, coacervation, phase separation method, polymerization, and emulsification/solvent evaporation method. However, emulsification/solvent evaporation techniques may be more useful compared to other methods. A suitable particle size control in the range of nanometers to micrometers can be achieved using this method, but there is a need for careful selection of encapsulation materials and various conditions in order to achieve high encapsulation efficiency and a low residual solvent content.

Several process variables are identified in the prior art, which could affect the formulation of microspheres produced by emulsification/solvent evaporation method; variables such as solvent type, solvent volume, active material to polymer ratio, rate of solvent removal, effect of internal aqueous phase volume in case of using the method of solvent evaporation followed by multiple emulsion, the effect of buffer or salt addition to the internal or external phase which can affect the size of microspheres and also the release pattern of the active material from the microspheres.

As is reported in the prior art, water-oil-water multiple emulsion system for microsphere preparation overcomes the problem of low encapsulation efficiency of water soluble active materials in the conventional water/oil emulsion solvent evaporation method.

It should be understood by a person skilled in the art that the emulsification is the first step of the emulsification/solvent evaporation method and has been extensively investigated in prior art. On the contrary the second step, the solvent transport out of the emulsion droplets, which determines the particle morphology and has a great influence on the microparticles encapsulation and release behavior has been scarcely studied. Usually, the solvent is highly volatile, which makes the solvent elimination process very fast and thus, difficult to observe.

The most desirable approach is to prepare capsules containing epoxy and its hardener because they are the exact materials used to prepare coatings and incorporation of these capsules in the epoxy matrix can build a repair system which is compatible with the host matrix. Several methods for encapsulation of epoxy resin are known from prior art. However, preparation of capsules containing a liquid amine is very difficult and only several attempts have been made to encapsulate reactive amine, because amine is soluble in both water and organic solvents.

A method for preparation of microcapsules containing diethylenetriamine (DETA) by interfacial polymerization is disclosed in prior art. But, the core content of the resultant capsules has high viscosity and it limits the healing capability of the system. In another method disclosed in prior art, hollow capsules are prepared and then they are filled with the reactive amine, but the yields for this encapsulation procedure ranged from 9.6% to 17.7%, and as is understood by a person skilled in the art, this is not a desirable core content for self-healing applications.

In another attempt disclosed in prior art, microcapsules containing reactive amine are prepared by multi emulsion system. However, this method had several flaws, such as, the large size distribution of microcapsules, very low core content (about 20%) and very long reaction time.

Two methods are disclosed in the prior art for preparation of microcapsules containing a hardener. However, it should be known that the prepared microcapsules in general have several disadvantages: they cannot be dispersed easily in the polymeric matrix; they would be visible in coatings and homogenous coating could not be obtained and microcapsules cannot be used in thin coatings in which the thickness of the coating is less than 1 micrometer.

The use of microcapsules containing solvent in self-healing composites is disclosed in the prior art. In this method, microcapsules are broken upon fracture, and the solvent is released in the crack. The big disadvantage of this method is the difference between the solvent and the matrix material.

The method of preparation of multiple emulsions by mixing a first emulsion in a second aqueous phase to form polymer beads is also disclosed in the prior art. This method produces porous polymer particles having a large size distribution with little control over the porosity, which, is not suitable for self-healing purposes.

Therefore, it is necessity to develop a process by which an amine can be encapsulated simply with high core content because it would reduce manufacturing cost and time consumption for nanocapsules production. There is also a need to provide flexible processes so that a wide range of nanocapsules containing different healing agents can be easily prepared.

SUMMARY

In one general aspect, the instant application describes a method for nanoencapsulation of an amine adduct in a polymeric shell. The method includes steps of emulsifying a first aqueous solution including the amine adduct into an organic solution including an organic solvent and a polymer to obtain a primary emulsion; emulsifying the primary emulsion into a second aqueous phase including a stabilizer to obtain a secondary emulsion; removing the organic solvent by evaporation to form solid nanocapsules; and separating the formed solid nanocapsules by centrifugation. The nanocapsules have an average size of between about 30 nm and about 597 nm.

The above general aspect may include one or more of the following features. The amine adduct may include a low molecular weight compound having a primary, a secondary or a tertiary amino group, or combinations thereof. The amine adduct may include a low molecular weight compound having a primary amino group selected from the group consisting of ethylenediamine, diethylenetriamine, triethylenetetramine, tetraethylenepentamine, hexamethylenediamine, isophorone diamine, bis(4-amino-3-methylcyclohexyl)methane, diaminodicyclohexylrnethane, m-xylenediamine, diaminodiphenylmethane, diaminodiphenylsulfone, and m-phenylenediamine; guanidines including dicyandiamide, methylguanidine, ethylguanidine, propylguanidine, butylguanidine, dimethylguanidine, trimethylguanidine, phenylguanidine, diphenylguanidine, and toluylguanidine. Alternatively or additionally, the amine adduct may include a low molecular weight compound having a secondary amino group selected from the group consisting of piperidine, pyrrolidine, diphenylamine, 2-methylimidazole, and 2-ethyl-4-methylimidazole. Alternatively or additionally, the amine adduct may include a low molecular weight compound having a tertiary amino group selected from the group consisting of imidazoles including 1-cyanoethyl-2-undecylimidazole-trimeilitate, imidazolyl succinic acid, 2-methylimidazole-succinic acid, 2-ethylimidazole-succinic acid, 1-cyanoethyl-2-methylimidazole, 1-cyanoethyl-2-undecylimidazole, arid 1-cyanoethyl-2-phenylimidazole; benzyldimethylamine, triethanolamine, 2,4,6-tris(dimethylaminomethyl)phenol, N,N'-dimethylpiperazine, triethylenediamine, 1,8-diazabicyclo[5.4.0]undec-7-ene, 1,5-diazabicyclo[4.3.0]non-5-ene, pyridine, and picoline.

The organic solution may further include a non-anionic surfactant. The non-anionic surfactant may be selected from the group consisting of span20, span40, span60, span80 and combinations thereof. The non-anionic surfactant may have a weight percent of about 2% to about 30%. More specifically, the non-anionic surfactant may have a weight percent of about 5% to about 15%. The concentration of the polymer in the organic solution may be about 0.01 mg/ml to about 0.05 mg/ml. More specifically, the concentration of the polymer in the organic solution may be about 0.015 mg/ml to about 0.025 mg/ml.

The method may further include a step of sonicating via a probe sonicator the primary solution for about 15 minutes to about 50 minutes with sonication power of between about 20 W to about 52 W. An emulsification temperature in emulsifying the first aqueous solution into the organic solution may be between about 20° C. and about 25° C.

The stabilizer may include glycerin with a concentration of about 25 to about 75 mg/ml. More specifically, the stabilizer may include glycerin with a concentration of about 40 to about 60 mg/ml. The second aqueous solution may further include a surfactant. The surfactant may include a non-ionic surfactant selected from the group consisting of tween20, tween40, tween60, tween80 and combinations thereof. The surfactant may include a non-ionic surfactant with a concentration of about 0.25 to about 2 weight percent. The surfactant may include a non-ionic surfactant with a concentration of about 0.25 to about 0.75 weight percent. The formed nanocapsules may have a core content of up to 50% amine adduct.

In another general aspect, the instant application describes a self-healing composite material that includes a matrix of at least one polymer material; a first set of nanocapsules containing an initiator; and a second set of nanocapsules containing a curing agent. The first and second sets of nanocapsules may be uniformly distributed and embedded in the matrix. The initiator may include an amine adduct. The initiator may include an amine adduct comprising a low molecular weight compound having a primary, a secondary or a tertiary amino group, or a combination thereof.

The initiator may include a low molecular weight compound having a primary amino group selected from the group consisting of ethylenediamine, diethylenetriamine, triethylenetetramine, tetraethylenepentamine, hexamethylenediamine, isophorone diamine, bis(4-amino-3-methylcyclohexyl)methane, diaminodicyclohexylmethane, m-xylenediamine, diaminodiphenylmethane, diamincdiphenylsulfone, and m-phenylenediamine; guanidines including dicyandiamide, rnethylguanidine, ethylguanidine, propylguanidine, butylguanidine, dimethylguanidine, trimethylguanidine, phenylguanidine, diphenylguanidine, and toluylguanidine. The initiator may include a low molecular weight compound having a secondary amino group selected from the group consisting of piperidine, pyrrolidine, diphenylamine, 2-methylimidazole, and 2-ethyl-4-methylimidazole. The initiator may include a low molecular weight compound having a tertiary amino group selected from the group consisting of imidazoles such as 1-cyanoethyl-2-undecylimidazole-trimellitate, imidazolyl succinic acid, 2-methylimidazole-succinic acid, 2-ethylimidazole-succinic acid, 1-cyanoethyl-2-methylimidazole, 1-cyanoethyl-2-undecylimidazole, and 1-cyanoethyl-2-phenylimidazole; benzyldimethylamine, triethanolamine, 2,4,6-tris(dimethylaminomethyl)phenol, N,N'-dimethylpiperazine, triethylenediamine, 1,8-diazabicyclo[5.4.0]undec-7-ene, 1,5-diazabicyclo[4.3.0]non-5-ene, pyridine, and picoline.

The curing agent may include an epoxy resin. The epoxy resin may be selected from the group consisting of a mono epoxy, a polyvalent epoxy compound, a poly epoxy compound, or a combination thereof. The curing agent may be an epoxy resin selected from the group consisting of butyl glycidyl ether, hexyl glycidyl ether, phenyl glycidyl ether, allylglycidyl ether, and p-tert-butylphenylglycidyl ether. The curing agent may include an epoxy resin selected from the group consisting of glyciclylatedbisphenols-type epoxy resin derived from bisphenolA, bisphenol F, bisphenol AD, and bisphenol S. The polymer matrix may be selected from the group consisting of a mono epoxy compound, a polyvalent epoxy compound, or mixtures thereof.

This application relates to a super-fast and simple preparation method of nanocapsules containing reactive amines with superb core content and high thermal resistance. Nanocapsules can be incorporated into epoxy resin to obtain self-healing coatings.

An object of the present application is to provide amine capsules with nanometric size and narrow size distribution which can be dispersed in the polymer matrix easily. A further object of the present application is to provide amine nanocapsules with high core content up to about 55%. A still further object of the present application is to provide a self-healing coating that includes both nanometric sizes of amine and epoxy capsules.

The foregoing and other objects, features, aspects and advantages of the present invention will become more apparent from the following detailed description of the present application when taken in conjunction with the accompanying drawing.

BRIEF DESCRIPTION OF THE DRAWINGS

While the specification concludes with claims particularly pointing out and distinctly claiming the subject matter that is regarded as forming the present application, it is believed that the application will be better understood from the following description taken in conjunction with the accompanying DRAWINGS, where like reference numerals designate like structural and other elements, in which:

DETAILED DESCRIPTION OF THE APPLICATION

Figure 1:
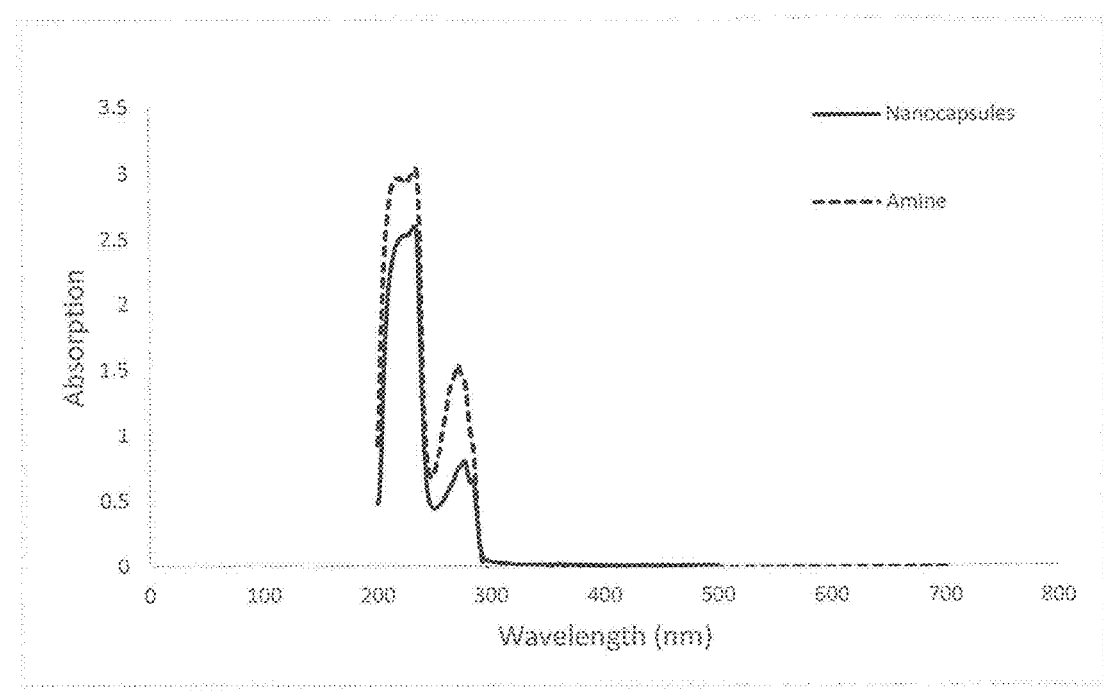
FIG. 1 illustrates the ultraviolet-visible spectroscopy (UV-vis) analysis of exemplary nanocapsules with styrene-methyl methacrylate as the shell (solid curve) and diamine (broken curve). The absorption spectra of the nanocapsules (solid curve) and diamine (broken curve) are presented in this figure.

The following detailed description is presented to enable any person skilled in the art to make and use the application. For purposes of explanation, specific nomenclature is set forth to provide a thorough understanding of the present application. However, it will be apparent to one skilled in the art that these specific details are not required to practice the application. Descriptions of specific applications are provided only as representative examples. Various modifications to the preferred implementations will be readily apparent to one skilled in the art, and the general principles defined herein may be applied to other implementations and applications without departing from the scope of the application. The present application is not intended to be limited to the implementations shown, but is to be accorded the widest possible scope consistent with the principles and features disclosed herein.

The inventors of the present application have discovered that a capsule-type amine as a core, which is covered by a specific capsule membrane, can address the above mentioned needs in the art. To this end, the present application discloses a method for encapsulating an amine adduct, which addresses the above mentioned needs. In this method, in spite of the nanometric size of the capsules, the core content includes up to 55% amine, which is a significantly high core content.

It should be understood by a person skilled in the art that the innovation described herein is a method for nanoencapsulation of a reactive amine with superb core content by means of an emulsification/solvent evaporation method and the use thereof in self-healing coatings. The superb core content may include amine of up to 55%. The emulsification/solvent evaporation method used herein to synthesize the nanocapsules containing a reactive amine, is a conceptually simple method. This method may include four main steps: first, an aqueous solution of the active agent (hereinafter designated by 'W1') is emulsified into an organic solution (hereinafter designated by 'O') containing an organic solvent and a specific amount of a suitable polymer which will form the shell of the nanocapsules; second, the primary emulsion (W1/O) is further emulsified into a second aqueous phase containing a stabilizer (hereinafter designated by 'W2') to form a W1/O/W2 secondary (or double) emulsion; third, the organic solvent is removed by evaporation or extraction and then solid nanocapsules are formed; and, finally, nanocapsules are collected by centrifugation as discussed in more detail herein below.

Regarding the first step or stage, a primary aqueous phase (W1) containing an active agent is emulsified into an organic solution (O) containing a controlled amount of a surfactant, an organic solvent, and a determined amount of a suitable polymer that forms the shell of the nanocapsules. The emulsification is achieved by sonication and the resultant emulsion is termed the primary emulsion hereinafter. in one implementation, the active agent is an amine adduct.

The amine adduct may include a low molecular weight compound having a primary, a secondary or a tertiary amino group, or a combination thereof. The low molecular weight compounds containing a primary amino group may include primary amines such as ethylenediamine, diethylenetriamine, triethylenetetramine, tetraethylenepentamine, hexamethylenediamine, isophorone diamine, bis(4-amino-3- methylcyclohexyl)methane, diaminodicyclohexylmethane, m-xylenediamine, diaminodiphenylmethane, diaminodiphenylsulfone, and m-phenylenediamine; guanidines such as dicyandiamide, methylguanidine, ethylguanidine, propylguanidine, butylguanidine, dimethylguanidine, trimethylguanidine, phenylguanidine, diphenylguanidine, and toluylguanidine.

The low molecular weight compounds containing a secondary amino group may include piperidine, pyrrolidine, diphenylamine, 2-methylimidazole, and 2-ethyl-4-methylimidazole. The Low molecular weight compounds containing a tertiary amino group may include imidazoles such as 1-cyanoethyl-2-undecylimidazole-trimellitate, imidazolyl succinic acid, 2-methylimidazole-succinic acid, 2-ethylimidazole-succinic acid, 1-cyanoethyl-2-methylimidazole, 1-cyanoethyl-2-undecylimidazole, and 1-cyanoethyl-2-phenylimidazole; benzyldimethylamine, triethanolamine, 2,4,6-tris(dimethylaminomethyl)phenol, N,N'-dimethylpiperazine, triethylenediamine, 1,8-diazabicyclo[5.4.0]undec-7-ene, 1,5-diazabicyclo[4.3.0]non-5-ene, pyridine, and picoline.

The surfactant in the first step or stage (hereinafter termed 'first surfactant'), is insoluble in water. The first surfactant may be non-anionic. Suitable first surfactants include span20, span40, span60, span80 or mixtures thereof, each of which, as is known in the art, are dry powders commercially available. The first surfactant dissolved in the oil phase may have a concentration from about 2 to about 30 weight percent and more specifically may have a concentration from about 5 to about 15 weight percent.

In some implementations, the organic solvent in the first step or stage could be a volatile organic solvent having a boiling point lower than that of water. To this end, the volatile organic solvent may have a boiling point less than 100° C., such as, for example dichloromethane. The solvent diffusion from polymer solution into the non-solvent phase and its evaporation rate are two important factors that should be considered. The concentration of the organic solvent may be between about 2.5 and about 7.5 percent by volume and more specifically may be between about 4 and about 6 percent by volume.

The suitable polymer in the first step or stage of the emulsification/solvent evaporation method, can be prepared from any type of polymer that is soluble in the organic solvent and is immiscible with water. The solubility of the polymer in the chosen solvent and boiling point of the solvent are two factors that affect how quickly the particles solidify. The concentration of polymer as the membrane of capsules may be in an amount of about 0.01 to about 0.05 mg/ml, and more specifically may be in an amount of about 0.015 to about 0.025 mg/ml.

In some implementations, the sonication time of the primary emulsion prepared in the first step or stage of the emulsification/solvent evaporation method is ranging from about 15 to about 50 seconds, and preferably, between about 30 to about 40 seconds. Furthermore, the sonication power may range from about 20 W to about 52 W, and more specifically may range between about 45 W and 52 W.

In one implementation, in the first step or stage the emulsification temperature is controlled to be between about 20° C. and about 25° C.

Regarding the second step or stage, the primary emulsion (W1/O) is further emulsified into a second aqueous phase (W2) containing a stabilizer and a second surfactant. Emulsification is achieved by the use of sonication. The resultant emulsion is called the secondary emulsion (W1/O/W2) hereinafter.

In one implementation, the aforementioned stabilizer in the second aqueous phase may include glycerin with a preferred concentration of about 25 to about 75 mg/ml and more preferably between about 40 and about 60 mg/ml.

In one implementation, the second surfactant in the second step or stage of the emulsification/solvent evaporation method, is substantially soluble in the water. The second surfactant may be non-ionic. Suitable second surfactants may include tween20, tween40, tween60, tween80 and mixtures thereof, which are commercially available. The tween surfactants are each mixtures of various polyoxyethylene fatty acid esters in liquid form. The concentration of the aforementioned second surfactant is about 0.25 to about 2 weight percent and more specifically is about 0.25 to about 0.75 weight percent.

Although tween60, PVA and span60 surfactants may be preferred, it will be apparent to a person skilled in the art that other, similar conventional surfactants may also be used in place of or in addition to the tween 60 and span60. In one implementation, such surfactants must, however, be non-ionic and capable of forming oil-in-Water and water-in-oil type emulsions.

Regarding the third step or stage, the organic solvent is removed by evaporation. In this step or stage, after the organic solvent is evaporated, solid nanocapsules form in the resultant suspension. Regarding the final step or stage, the resultant suspension containing nanocapsules is centrifuged, and then, washed multiple times to remove residual water and surfactant.

In another aspect of the present application, the nanocapsules containing reactive amine, prepared by the method described hereinabove, can be used in a self-healing composition in which the reactive amine acts as the initiator and an epoxy resin acts as the curing agent. The self-healing composition may include a matrix of at least one polymer material and two types of nanocapsules. The first type of nanocapsules may contain the initiator. The second type of nanocapsules may contain the curing agent. The curing agent may be uniformly distributed and embedded in the matrix. The curing agent and the initiator are releasable by a crack in the matrix and are able to bond to the matrix to repair the crack. When a crack is created in the matrix, nanocapsules containing different resins may rupture and their core may be released in the crack, and then, the polymerization may occur and the crack may be fixed.

In one implementation, an epoxy resin is used as the curing agent. The epoxy resin may be a mixture of a mono epoxy and a polyvalent epoxy compound, or a poly epoxy compound. The mono epoxy compound could be butyl glycidyl ether, hexyl glycidyl ether, phenyl glycidyl ether, allylglycidyl ether, p-tert-butylphenylglycidyl ether, etc.

The polyvalent epoxy compound may be glyciclylated-bisphenols-type epoxy resin derived from bisphenolA, bisphenol F, bisphenol AD, bisphenol S, or their derivatives. The polymer matrix may be a mono epoxy compound, a polyvalent epoxy compound, or mixtures thereof.

Exemplary techniques for the production of nanocapsules containing a reactive amine and use thereof in self-healing composition pursuant to the teachings of the present application are set forth below. It should be understood that these examples are illustrative only, and similar techniques for the production and application of the preferred nanocapsules of the instant application are thus possible with different parameters, as is all well understood to those of skill in the art. The examples should not be deemed as limiting the scope of the present application. The only limitations of the scope of the instant case are set forth in the claims appended hereinbelow.

EXAMPLE 1

In this example, 0.5 ml diamine (W1) was emulsified into a 5 ml dichloromethane solution (O) containing 150 mg polystyrene as the shell of the nanocapsules, and 0.1 gram span60 as the internal surfactant. The emulsification was carried out by sonication using a probe sonicator at 52% power for 20 seconds and the primary emulsion (W1/O) was formed. Next, 15 ml of an aqueous phase containing 7.5 ml glycerin, 7.5 ml deionized water and 1.2 gram of tween60 as the external surfactant (W2) was immediately poured into this primary emulsion (W1/O) and was sonicated under the same conditions described hereinabove for 20 s to produce a W1/O/W2 emulsion. The system was then attached to rotary vacuum evaporator immediately until the middle oil phase evaporated. Finally, the nanocapsules produced as described hereinabove, were collected by centrifugation. Multiple washes and centrifugation steps were necessary to remove the excess water and surfactant. All the process was performed at ambient temperature (25° C.). The resultant nanocapsules are labeled as S2-T8 PS 150 nanocapsules.

EXAMPLE 2

In this example, all the steps described in connection with Example 1 were carried out the same, with the exception of the amount of span60 which acts as the internal surfactant in the organic solution (O). Here, 0.2 g span60 was used instead of 0.1 g as disclosed in the Example 1. The resultant nanocapsules are labeled as S4-T8PS 150 nanocapsules.

EXAMPLE 3

In this example, all the steps described in connection with Example 1 were carried out the same, with the exception of the amount of span60 which acts as the internal surfactant in the organic solution (O). Here, 0.4 g span60 was used in this example. The resultant nanocapsules are labeled as S8-T8 PS 150 nanocapsules.

EXAMPLE 4

In this example, all the steps described in connection with Example 1 were carried out the same, with the exception of the amount of span60 which acts as the internal surfactant in the organic solution (O). Here, 0.8 g span60 was used in this implementation. The resultant nanocapsules are labeled as S16-TRPS 150 nanocapsules.

EXAMPLE 5

In this example, all the steps described in connection with Example 1 were carried out the same, with the exception of the amount of span60 which acts as the internal surfactant in the organic solution (O) and the amount of tween60 which acts as the external surfactant. Here, 0.4 g span60 and 0.3 g tween60 were used in this implementation. The resultant nanocapsules are labeled as S8-T2PS 150 nanocapsules.

EXAMPLE 6

In this example, all the steps described in connection with Example 1 were carried out the same, with the exception of the amount of span60 which acts as the internal surfactant in the organic solution (O) and the amount of tween60 which acts as the external surfactant. Here, 0.4 g span60 and 0.6 g tween60 were used in this implementation. The resultant nanocapsules are labeled as S8-T4PS 150 nanocapsules.

EXAMPLE 7

In this example, all the steps described in connection with Example 1 were carried out the same, with the exception of the amount of span60 which acts as the internal surfactant in the organic solution (O) and the amount of tween60 which acts as the external surfactant. Here, 0.4 g span60 and 1.2 g tween60 were used in this implementation. The resultant nanocapsules are labeled as S8-T8PS 150 nanocapsules.

EXAMPLE 8

In this example, all the steps described in connection with example 1 were carried out the same, with the exception of the amount of span60 which acts as the internal surfactant in the organic solution (O) and the amount of tween60 which acts as the external surfactant. Here, 0.4 g span60 and 2.4 g tween60 were used in this implementation. The resultant nanocapsules are labeled as S8-T16PS 150 nanocapsules.

The performance data for the nanocapsules of Examples 1 to 8 are summarized in Table 1. The amount of Span60 is reported as its weight percent in the internal organic phase and the amount of Tween60 is reported as its weight percent in the external aqueous solution.

The encapsulation efficiency and the core content, reported and set forth in Table 1 are measured, as is known in the art, by ultraviolet: absorption (UV) at the maximum wavelength. As is well known in the art, the Beer's law is used to determine the concentration of diamine in nanocapsules.

As is known in the art, the nanoparticles core conient, the encapsulation efficiency and wall thickness are found from the equations:

$$\text{Core content } (\%) = \frac{\text{weight of diamine in Nano-capsules (mg)}}{\text{weight of Nano-capsules (mg)}}.$$

$$\text{Loading efficiency } (\%) = \frac{\text{amount of encapsulated diamine in Nano-capsules (mg)}}{\text{initial amount of diamine used in the recipe (mg)}}.$$

$$\text{Wall thickness } (h) \text{ (nm)} = \frac{r(1-p)d_1}{3[pd_2 + (1-p)d_1]}.$$

In the wall thickness equation, h is the wall thickness of nanocapsules reported in mm, r is the arithmetic mean radius, $d_1$ is the density of the core materials, $d_2$ is the density of the shell, and p is the core content of nanocapsules obtained as discussed hereinabove.

TABLE 1

Characterization of nanocapsules prepared in Examples 1 to 8

| Span 60 (wt %) | Tween 60 (wt %) | Size (nm) | Poly Dispersity Index (PDI) | Core Content (%) | Nanocapsule Shell Thickness, h (nm) | Encapsulation efficiency (%) |
|---|---|---|---|---|---|---|
| 2 | 8 | 187 | 0.232 | 48.6 | 23.64 | 63.11 |
| 4 | 8 | 134 | 0.24 | 42.8 | 20.07 | 55.58 |

TABLE 1-continued

Characterization of nanocapsules prepared in Examples 1 to 8

| Span 60 (wt %) | Tween 60 (wt %) | Size (nm) | Poly Dispersity Index (PDI) | Core Content (%) | Nanocapsule Shell Thickness, h (nm) | Encapsulation efficiency (%) |
|---|---|---|---|---|---|---|
| 8 | 8 | 84.9 | 0.241 | 23.5 | 21.65 | 30.51 |
| 16 | 8 | 30 | 0.26 | 13.4 | 10.11 | 17.40 |
| 8 | 2 | 144 | 0.437 | — | — | — |
| 8 | 4 | 52 | 0.21 | 36.8 | 9.22 | 47.79 |
| 8 | 8 | 105 | 0.248 | 20 | 29.47 | 25.97 |
| 8 | 16 | 355 | 0.49 | 17.6 | 130.50 | 18.44 |

EXAMPLE 9

In this example, 0.5 ml diamine (W1) was emulsified into a 5 ml dichloromethane solution (O) containing 150 mg polystyrene as the shell of the nanocapsules, and 0.1 gram span60 as the internal surfactant. The emulsification was carried out by sonication using a probe sonicator at 52 W for 20 seconds and the primary emulsion (W1/O) was formed. Next, 15 ml of a 1 wt % solution of PVA as the external surfactant was immediately poured into this primary emulsion (W1/O) and was sonicated under the same conditions described hereinabove for 20 s to produce a W1/O/W2 emulsion. The system was then attached to rotary vacuum evaporator immediately until the middle oil phase evaporated. Finally, the produced nanocapsules were collected by centrifugation. Multiple washes and centrifugation steps were necessary to remove the excess water and surfactant. All the process was performed at ambient temperature (25° C.). The resultant nanocapsules are labeled as S8-PVA1PS 150 nanocapsules.

EXAMPLE 10

In this example, all the steps described in connection with Example 9 were carried out the same, with the exception of the amount and the concentration of the PVA solution. Here, 30 ml of a 2 wt % solution of PVA was immediately poured into this primary emulsion (W1/O). The resultant nanocapsules are labeled as S8-PVA2PS 150 nanocapsules.

EXAMPLE 11

In this example, all the steps described in connection with Example 10 were carried out the same, with the exception of the amount of polystyrene which was decreased to half. The resultant nanocapsules are labeled as S8-PVA2PS 75 nanocapsules.

The performance data for the nanoparticles of Examples 9 to 11 are summarized in Table 2.

TABLE 2

Characterization of nanocapsules from Examples 9 to 11

| Shell | Polymer weight (mg) | Span 60 (wt %) | PVA (wt %) | Size (nm) | PDI | Core Content (%) | h (nm) | Encapsulation efficiency (%) |
|---|---|---|---|---|---|---|---|---|
| Polystyrene | 150 | 8 | 1 | 100 | 0.292 | 44.2 | 14.38 | 57.4 |
| Polystyrene | 150 | 8 | 2 | 539 | 0.352 | 46 | 73.59 | 59.74 |
| Polystyrene | 75 | 8 | 2 | 92.6 | 0.235 | 49.6 | 11.36 | 57.01 |

EXAMPLE 12

In this example, 0.5 ml diamine (W1) was emulsified into a 5 ml dichloromethane solution (O) containing 150 mg styrene-methyl methacrylate (in three mole ratios of 25:75, 50:50 and 75:25) as the shell of nanocapsules, and 0.4 g span60 as the internal surfactant. The emulsification was carried out by sonication using a probe sonicator at 52% power for 20 seconds and the primary emulsion (W1/O) was formed. Next, 15 ml of an aqueous phase containing 7.5 ml glycerin, 7.5 ml deionized water and 0.3 g tween60 as the external surfactant (W2) was immediately poured into this primary emulsion (W1/O) and was sonicated under the same conditions described hereinabove for 20 s to produce a W1/O/W2 emulsion. The system was then attached to rotary vacuum evaporator immediately until the middle oil phase evaporated (5 ml). Finally, the nanocapsules produced as described were collected by centrifugation. Multiple washes and centrifugation steps were necessary to remove excess water and surfactant. All the process was performed at ambient temperature (25° C.). The resultant nanocapsules are labeled as S8-T2st-MMA nanocapsules.

EXAMPLE 13

In this example, all the steps described in connection with Example 12 were carried out the same, with the exception of the amount of tween60 which acts as the external surfactant. Here, 2.4 g of tween60 was used in this implementation. The resultant nanocapsules are labeled as S8-T16st-MMA nanocapsules.

EXAMPLE 14

In this example, all the steps described in connection with Example 12 were carried out the same, with the exception of the amount of span60 which acts as the internal surfactant in the organic solution (O) and the amount of tween60 which acts as the external surfactant. Here, 0.1 g span60 and 1.2 g tween60 were used in this implementation. The resultant nanocapsules are labeled as S2-T8st-MMA nanocapsules.

EXAMPLE 15

In this example, all the steps described in connection with Example 12 were carried out the same, with the exception of the amount of span60 which acts as the internal surfactant in the organic solution (O) and the amount off tween60 which acts as the external surfactant. Here, 0.8 g span60 and 1.2 g tween60 were used in this implementation. The resultant nanocapsules are labeled as S16-T8st-MMA nanocapsules.

The performance data for the nanoparticles of Examples 12 to 15 are summarized in Table 3.

TABLE 3

Characterization of nanocapsules from Examples 12 to 15

| Shell | Polymer weight (mg) | Span 60 (wt %) | Tween 60 (wt %) | Size (nm) | PDI | Core Content (%) | h (nm) | Encapsulation efficiency (%) |
|---|---|---|---|---|---|---|---|---|
| St-MMA (75-25) | 150 | 2 | 8 | 199 | 0.219 | 39.40 | 42.59 | 51.16 |
|  |  | 16 | 8 | 98.4 | 0.222 | 23.76 | 35.47 | 20.58 |
|  |  | 8 | 2 | 132 | 0.116 | 18.03 | 45.45 | 23.41 |
|  |  | 8 | 16 | 450 | 0.496 | 33.85 | 109.66 | 43.96 |
| St-MMA (50-50) | 150 | 2 | 8 | 215 | 0.226 | 44.43 | 36.55 | 57.70 |
|  |  | 16 | 8 | 121 | 0.236 | 37.12 | 24.86 | 48.20 |
|  |  | 8 | 2 | 113 | 0.223 | 14.47 | 40.50 | 18.79 |
|  |  | 8 | 16 | 564 | 0.529 | 42.87 | 96.74 | 55.67 |
| St-MMA (25-75) | 150 | 2 | 8 | 252 | 0.163 | 20.30 | 71.95 | 26.36 |
|  |  | 16 | 8 | 133 | 0.256 | 16.88 | 41.59 | 21.01 |
|  |  | 8 | 2 | 58.4 | 0.189 | 20.86 | 16.32 | 27.09 |
|  |  | 8 | 16 | 597 | 0.436 | 38.63 | 160.77 | 50.16 |

EXAMPLE 16

In this example, 0.5 ml diamine (W1) was emulsified into a 5 ml dichloromethane solution (O) containing 150 mg styrene-methyl methacrylate (in three mole ratios of 25:75, 50:50 and 75:25) as the shell of nanocapsules, and 0.4 gr span60 as the internal surfactant. The emulsification was carried out by sonication using a probe sonicator at 52% power for 20 seconds and the primary emulsion (W1/O) was formed. Next, 15 ml of a 2% solution of PVA was immediately poured into this primary emulsion (W1/O) and was sonicated under the same conditions described hereinabove for 20 s to produce a W1/O/W2 emulsion. The system was then attached to rotary vacuum evaporator immediately until the middle oil phase evaporated (5 ml). Finally, the nanocapsules produced as described were collected by centrifugation. Multiple washes and centrifugation steps were necessary to remove excess water and surfactant. The whole process was performed at ambient temperature (25° C.). The resultant nanocapsules are labeled as S8-PVA2st-MMA nanocapsules The performance data for the nanoparticles of Examples 12 to 15 are summarized in Table 4.

TABLE 4

Characterization of nanocapsules of Examples 16

| Shell | Polymer weight (mg) | Span 60 (wt %) | PVA (wt %) | Size (nm) | PDI | Core Content (%) | h (nm) | Encapsulation efficiency (%) |
|---|---|---|---|---|---|---|---|---|
| St-MMA (75-25) | 75 | 8 | 2 | 289 | 0.247 | 33.9 | 70.34 | 38.96 |
| St-MMA (50-50) | 75 | 8 | 2 | 398 | 0.22 | 34.1 | 88.19 | 39.19 |
| St-MMA (25-75) | 75 | 8 | 2 | 579 | 0.152 | 22.25 | 156.71 | 25.57 |

With reference now to the Tables 1 to 4, the data set forth and presented in these tables show that by increasing the concentration of the internal surfactant, the size of nanocapsules decreases and by increasing the amount of external surfactant, the size of the nanocapsules increases. Also, an increase in the concentration of PVA leads to a considerable increase in the size of the nanocapsules. However, decreasing the polymer weight at constant amount of the PVA, decreases the size of nanocapsules from 100 nm to 92.6 nm.

The Amine content and the encapsulation efficiency of the nanocapsules were obtained by ultraviolet-visible spectroscopy (UV-VIS) analysis, and the size of the nanocapsules was determined by Dynamic light scattering (DLS) analysis. Scanning electron microscopy (SEM) was performed on the samples. Thermo-gravimetry analysis (TGA) was performed to compare the thermal resistance of the nanocapsules.

In order to confirm the presence of diamine in the nanocapsules and to calculate the core content and encapsulation efficiency set forth in Tables 1 to 4, UV-VIS spectra of the nanocapsules prepared by polystyrene and St-MMA were measured.

Reference now is made in detail to the examples illustrated in the accompanying drawings and discussed below. FIG. 1 illustrates the ultraviolet-visible spectroscopy (UV-vis) analysis of exemplary nanocapsules with styrene-methyl methacrylate as the shell (solid curve) and diamine (broken curve). The similarity of absorption spectra of the nanocapsules (solid curve) and diamine (broken curve) is an indication of the successful encapsulation of active amine.

Figure 2:
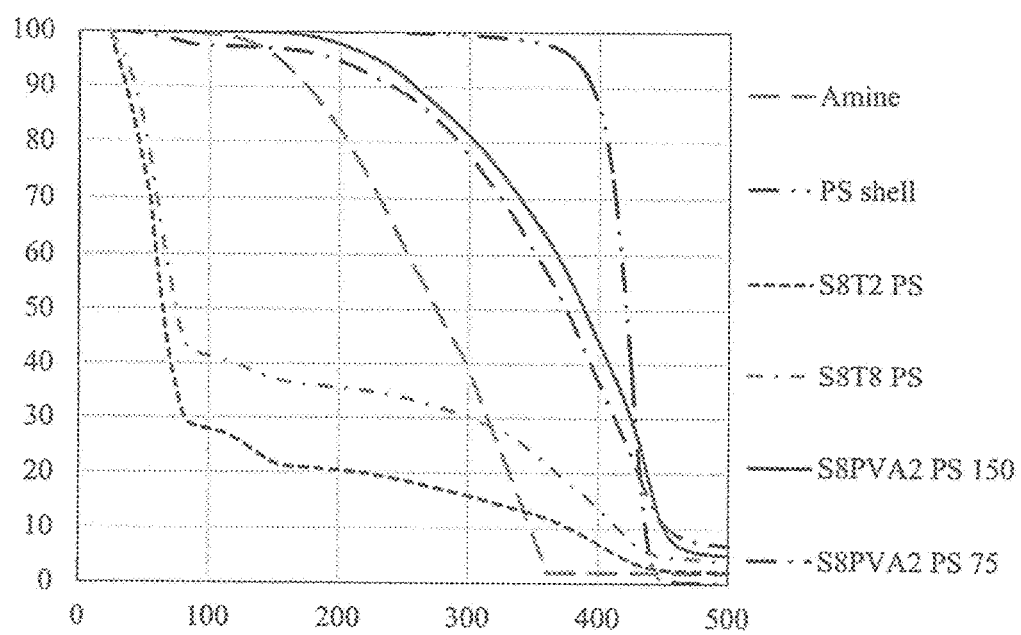
FIG. 2 illustrates a thermo-gravimetric analysis (TGA) thermograph of diamine nanocapsules with poly styrene as the shell, prepared pursuant to the teachings of the present application.

With reference now to FIG. 2 of the DRAWINGS, in this figure the thermographs of nanocapsules with polystyrene as the shell, prepared in Examples 5, 7, 10 and 11 are compared and it is understood that nanocapsules prepared with PVA and span are more thermal resistance than those prepared with span and tween and the amount of polymer as the shell does not have any considerable effect on the thermal resistance. Also thermo-gravimetric analysis indicated that each surfactant can have a particular effect on the thermal stability of the specimens and nanocapsules with high thermal stability can be obtained using the proper surfactants.

Figure 3:
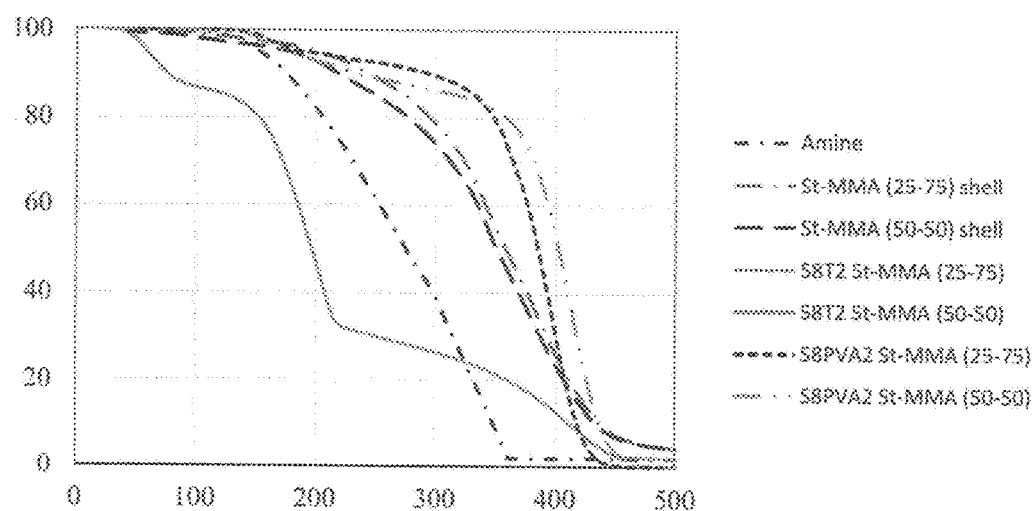
FIG. 3 illustrates a thermo-gravimetric analysis (TGA) thermograph of diamine nanocapsulespoly styrene-methyl methacrylateas the shell, prepared pursuant to the teachings of the present application.
Figure 4A:
FIG. 4a-d illustrate scanning electron microscope (SEM) images of exemplary nanotubes containing amine.
Figure 4B:
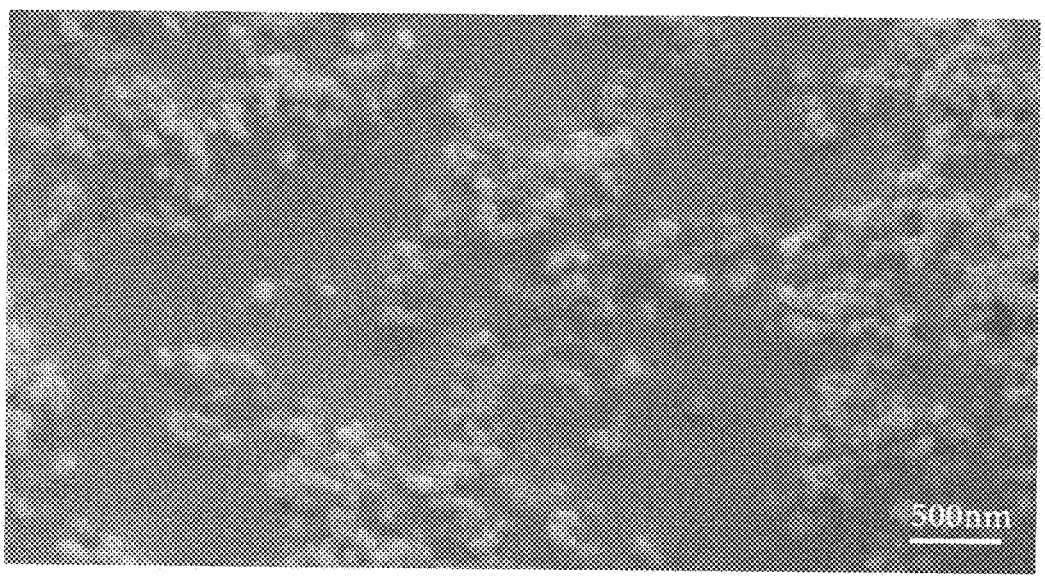
Figure 4C:
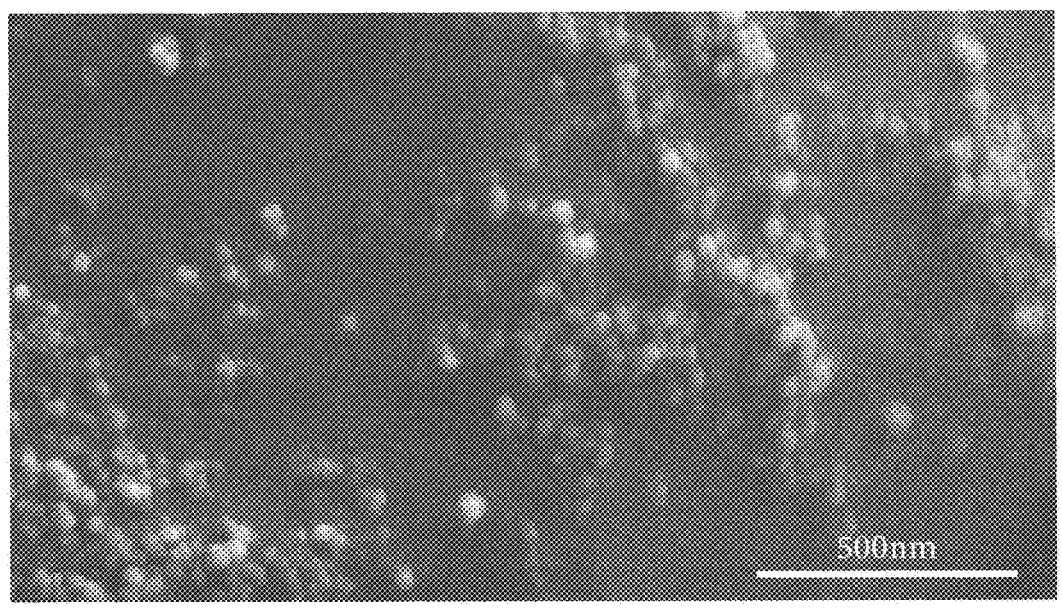
Figure 4D:
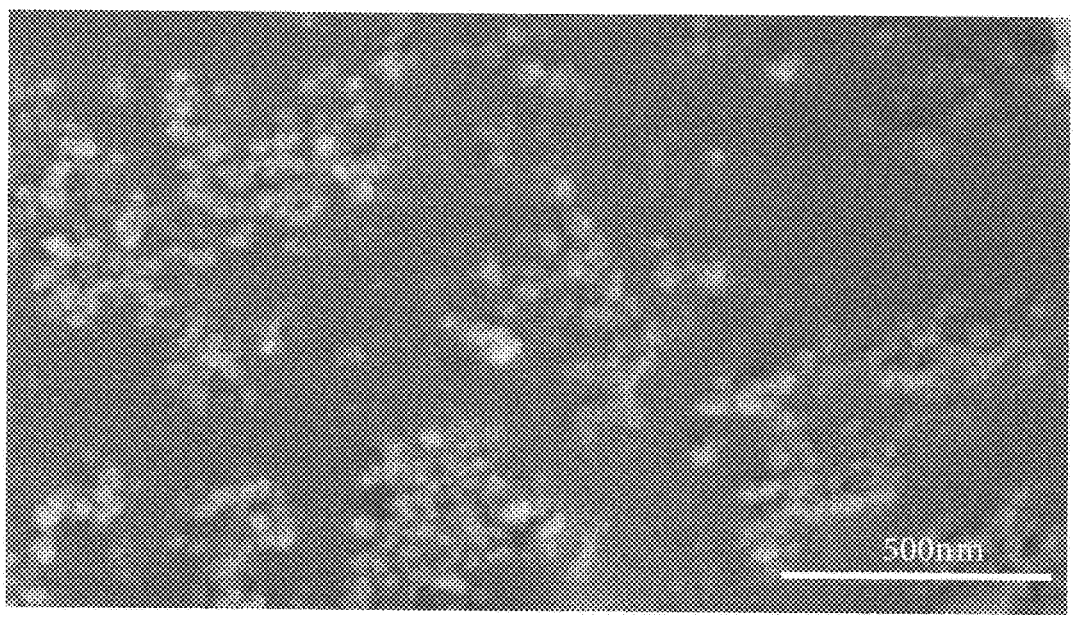

With reference now to FIG. 3 of the DRAWINGS, in this figure thermographs of nanocapsules with styrene-methyl methacrylate as the shell, prepared in Examples 12 and 16 are compared and it is understood that nanocapsules in which St-MMA was used as the shell material and PVA was used as the surfactant were more stable.

With reference now to FIGS. 4a-d of the DRAWINGS, these figures illustrate the SEM images of the nanocapsules prepared pursuant to the teachings of the present application in Examples 2, 9, 10 and 12, respectively). These images reveal that the capsules are spherical in shape, nearly monodisperse in capsule diameter, and have smooth non-porous shell walls.

EXAMPLE 17

Preparation of Nanocapsules Containing an Epoxy Resin

In this implementation example, nanocapsules containing epoxy resin as the curing agent in the self-healing composition disclosed hereinabove are prepared by an in-situ polymerization in an oil-in-water emulsion. Here, 52 ml of deionized water and 8 wt % of polyvinyl alcohol (PVA) are mixed at room temperature in a beaker. Then, 1 g of urea, 0.2 g of ammonium chloride and 0.1 g of resorcinol are dissolved in the aqueous solution of PVA, prepared as described hereinabove, under 1000 rpm agitation rate. The pH is adjusted to approximately 3.5 by adding 5 wt % solution of hydrochloric acid in deionized water. 1-octanol is added as an antifoaming agent, then 12.5 ml of an epoxy resin (which is a mixture of EPON 828 and Cardura with a weight ratio of 100 to 15. Cardura is used to reduce the viscosity of the epoxy resin) is added slowly to the mixture to form an emulsion and the resultant emulsion is stabilized for 30 minutes under agitation. The tapered 3 mm tip sonication horn of a 200 W ultrasonic homogenizer is placed in the solution for several minutes at 52% intensity (3.0 kj of input energy). After sonication, 2.56 g of 37 wt % aqueous solution of formaldehyde is added. The emulsion is covered and slowly heated. Then, the temperature is maintained at 55° C. for 4 hours. Finally, the resultant nanocapsules are washed several times to extract the surfactant and after that the nanocapsules are freeze dried. The size of the resultant nanocapsules is about 177 nm. Theses nanocapsules which contain the epoxy resin are then mixed in the matrix of the epoxy with amine nanocapsules to form a self-healing composition.

EXAMPLE 18

Nanocapsules containing amine as the initiator prepared as disclosed in Example 11 and nanocapsules containing the epoxy resin as the curing agent prepared as disclosed in Example 17 are incorporated in an epoxy matrix with a ratio of 1:2, respectively, to form a self-healing coating. The aforementioned coating is then applied to a 1*1.5 cm×cm steels substrates for corrosion testing. The steel grade is AISI316. The primer is the mixture of the epoxy resin and amine without any nanocapsules.

Figure 5:
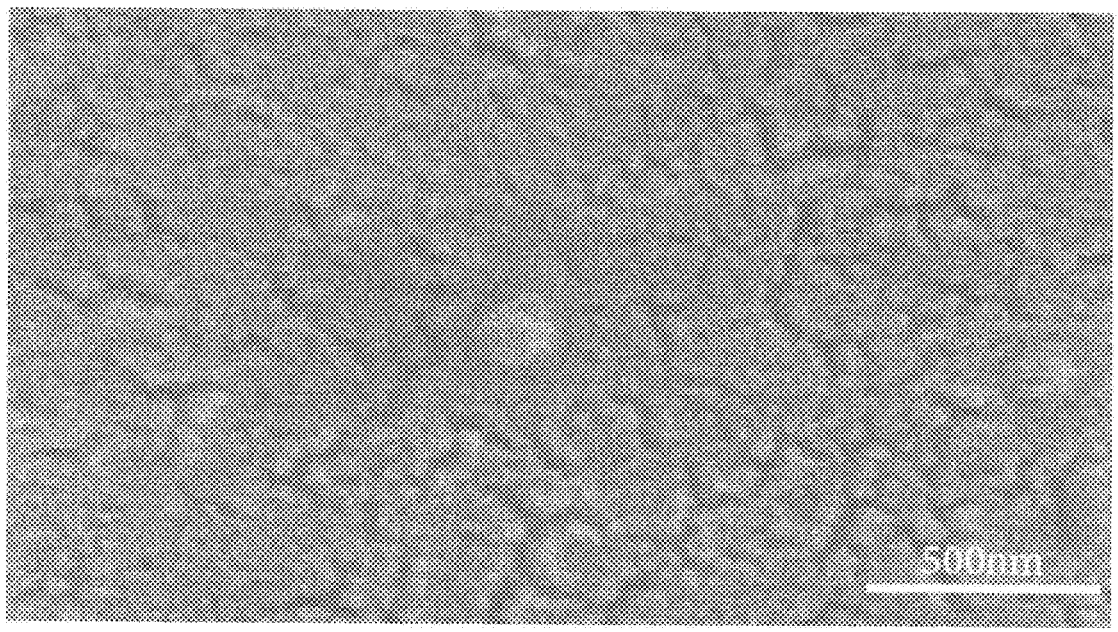
FIG. 5 illustrates the scanning electron microscope (SEM) image of exemplary amine nanocapsules incorporated in the epoxy composite.

With reference now to FIG. 5 of the DRAWINGS, this figure illustrates the SEM image of the amine nanocapsules incorporated in the epoxy composite pursuant to the teachings of the implementation Example 18 of the present application.

Different coating samples containing 0, 2.5, 5, 7.5 and 10 wt % of nanocapsules in the primer (the mixture of amine and the epoxy resin without the nanocapsules) were prepared. The edges and all the faces of the steel panel samples were sealed using the primer coating.

After allowing the samples to fully cure, X-cut scratches were made on each sample panel to investigate the performance of the nanocapsules in the self-healing coatings. Then samples were immersed in a 3.5 wt % NaCl solution for 35 days. In order to determine the relative degree of coating degradation at the scribed area, electrochemical impedance spectroscopy (EIS) evaluations were performed on the prepared samples, after 1, 14 and 35 days immersion in a corrosive environment.

Figure 6:
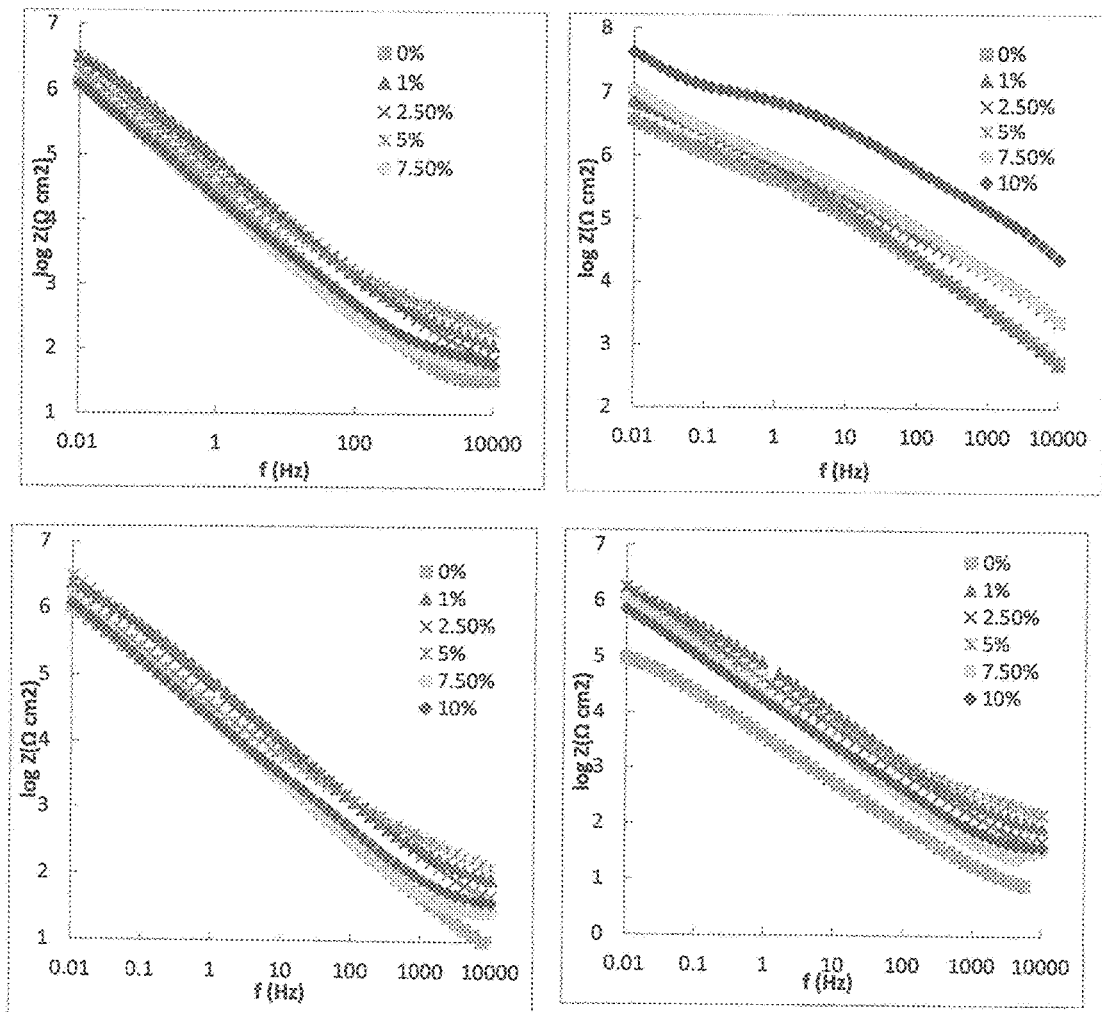
FIG. 6 illustrates Bode-Magnitude plots as the logarithm of the impedance modulus ($\Omega$) vs. the logarithm of the frequency (Hz) for composites having different amounts of nanocapsules for different immersing times: before scratch (TOP LEFT), after 1 day immersion (TOP RIGHT), after 14-day immersion (BOTTOM LEFT), and after 35-day immersion (BOTTOM RIGHT).

With reference now to FIG. 6 of the drawings, these figures show Bode-Magnitude plots as Log Impedance Modulus ($\Omega$) vs. Log Frequency (Hz), over a frequency range of 10 KHz to 10 MHz. According to the plots, the impedance modulus of the scribed area of the sample containing the nanocapsules is greater than the impedance modulus of the scribed area of the coating with no nanocapsules. This is an objective indicator of the nanocapsules having sealed the substrate by releasing their content into scratches and consequently initiating the polymerization of the curing agent and preventing further growth of the scribed area. According to the data, among the coatings containing the nanocapsules, the coating with 2.5% weight of nanocapsules is the optimum composition that shows the highest corrosion resistance.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for nanoencapsulation of an amine in a polymeric shell, the method comprising steps of:
   emulsifying a first aqueous solution including the amine into an organic solution including an organic solvent and a polymer to obtain a primary emulsion;
   emulsifying the primary emulsion into a second aqueous phase including a stabilizer to obtain a secondary emulsion;
   removing the organic solvent by evaporation to form solid nanocapsules; and
   separating the formed solid nanocapsules by centrifugation, wherein said nanocapsules have an average size of between about 30 nm and about 597 nm.

2. The method of claim 1, wherein the amine includes a compound having a primary, a secondary or a tertiary amino group, or combinations thereof.

3. The method of claim 1, wherein the amine includes a compound having a primary amino group selected from the group consisting of ethylenediamine, diethylenetriamine, triethylenetetramine, tetraethylenepentamine, hexamethylenediamine, isophorone diamine, bis(4-amino-3-methylcyclohexyl)methane, diaminodicyclohexylmethane, m-xylenediamine, diaminodiphenylmethane, diaminodiphenylsulfone, m-phenylenediamine, and guanidines.

4. The method of claim 1, wherein the amine includes a compound having a secondary amino group selected from the group consisting of piperidine, pyrrolidine, diphenylamine, 2-methylimidazole, and 2-ethyl-4-methylimidazole.

5. The method of claim 1, wherein the amine includes a compound having a tertiary amino group selected from the group consisting of 1-cyanoethyl-2-undecylimidazole-trimellitate, imidazolyl succinic acid, 2-methylimidazole-succinic acid, 2-ethylimidazole-succinic acid, 1-cyanoethyl-2-methylimidazole, 1-cyanoethyl-2-undecylimidazole, and 1-cyanoethyl-2-phenylimidazole; benzyldimethylamine, triethanolamine, 2,4,6-tris(dimethylaminomethyl)phenol, N,N'-dimethylpiperazine, triethylenediamine, 1,8-diazabicyclo[5.4.0]undec-7-ene, 1,5-diazabicyclo[4.3.0]non-5-ene, pyridine, and picoline.

6. The method of claim 1, wherein the organic solution further includes a non-anionic surfactant.

7. The method of claim 6, wherein the non-anionic surfactant has a weight percent of about 2% to about 30%.

8. The method of claim 6, wherein the non-anionic surfactant has a weight percent of about 5% to about 15%.

9. The method of claim 1, wherein the concentration of the polymer in the organic solution is about 0.01 mg/ml to about 0.05 mg/ml.

10. The method of claim 1, wherein the concentration of the polymer in the organic solution is about 0.015 mg/ml to about 0.025 mg/ml.

11. The method of claim 1, further comprising:
    sonicating via a probe sonicator the primary solution for about 15 minutes to about 50 minutes with sonication power of between about 20 W to about 52 W.

12. The method of claim 1, wherein an emulsification temperature in emulsifying the first aqueous solution into the organic solution is between about 20° C. and about 25° C.

13. The method of claim 1, wherein the stabilizer includes glycerin with a concentration of about 25 to about 75 mg/ml in the second aqueous phase.

14. The method of claim 1, wherein the stabilizer includes glycerin with a concentration of about 40 to about 60 mg/ml in the second aqueous phase.

15. The method of claim 1, wherein the second aqueous solution further includes a surfactant.

16. The method of claim 15, wherein the surfactant includes a non-ionic surfactant with a concentration of about 0.25 to about 2 weight percent.

17. The method of claim 15, wherein the surfactant includes a non-ionic surfactant with a concentration of about 0.25 to about 0.75 weight percent.

18. The method of claim 1, wherein the formed nanocapsules have a core content of up to 50% amine.

19. The method of claim 1, wherein the amine includes a compound having a primary amino group selected from the group consisting of diamine, ethylenediamine, diethylenetriamine, triethylenetetramine, tetraethylenepentamine, hexamethylenediamine, isophorone diamine, diaminodicyclohexylmethane, m-xylenediamine, and m-phenylenediamine.

20. The method of claim 1, wherein the amine includes a compound having a tertiary amino group selected from the group consisting of 1-cyanoethyl-2-undecylimidazole-trimellitate, imidazolyl succinic acid, 2-methylimidazole-succinic acid, 2-ethylimidazole-succinic acid, 1-cyanoethyl-2-methylimidazole, 1-cyanoethyl-2-undecylimidazole, and 1-cyanoethyl-2-phenylimidazolel.

* * * * *